United States Patent Office 2,954,353
Patented Sept. 27, 1960

2,954,353

ADHESIVE MIXTURE CONTAINING POLYVINYL ALCOHOL, LIGNOSULFONIC ACID AND A MIGRATION INHIBITOR

Donald S. Bruce and Howard L. Heise, Troy, Ohio, assignors to St. Regis Paper Company, a corporation of New York No Drawing. Filed June 25, 1957, Ser. No. 667,983

2 Claims. (Cl. 260—17.5)

In our U.S. Patent No. 2,443,889, issued June 22, 1948, much stress is placed on the application of our new adhesive in the manufacture of gummed tape. This application has, in fact, achieved very substantial production and its value is well recognized as a desirable substitute by producers employing conventional adhesive such as animal glue and dextrine.

The experience accumulated over several years and a great many tons of production has proven that, although usable adhesives can be produced from a wide variety of sulphite liquor concentrate, the best compositions result from mixtures of polyvinyl alcohol and sulphite liquor concentrates from which all or a portion of the naturally occurring sugars have been removed. Thus, as the art has now been developed, our preferred adhesive composition for remoistenable gummed tape falls within the following quoted claim 2 of U.S. Patent No. 2,443,889:

"An adhesive the active adhesive agent therein consisting of at least three percent of polyvinyl alcohol and at least 75 percent of a de-sugarized concentrate of waste sulphite liquor containing ligno sulphonic acid, calculated on a dry basis."

As a source of desugarized sulphite liquor concentrate, we have found on the market several satisfactory commercially available products. One is a concentrate resulting from the fermentation of sulphite liquor for alcohol recovery. Another is stripped of sugar by the growth and recovery of valuable yeast bodies.

Although, as we have stated, we have produced practical remoistenable tape adhesives from mixtures of polyvinyl alcohol and a wide variety of sulphite liquor concentrates, including calcium, magnesium and ammonium base liquors and superior compositions from desugarized concentrates, we have noted from our accumulated information, certain peculiar and undesirable behavior of the gummed tape when subjected to unlikely but nevertheless possible conditions of exposure or storage. It is with the correction of this peculiar and undesirable behavior that our present invention relates. This application is a continuation-in-part of our application Serial No. 387,508 filed October 21, 1953, and now abandoned.

We have found that gummed sealing tape, produced by coating kraft paper with one of our typical compositions, as for example:

| | Percent |
|---|---|
| Desugarized sulphite liquor concentrate (Toranil) | 41 |
| Polyvinyl alcohol (Dupont 52–22) | 4 |
| Water soluble plasticizer | 5 |
| Water | 50 | and packaged in normal manner, using a water resistant barrier paper or similar protection from atmospheric moisture, will retain its original excellent performance characteristics for a long period. By contrast, exposed and unprotected rolls of tape undergo change, particularly as regards quick tack, when certain atmospheric conditions are encountered. We have observed that when tape of the composition noted above is subjected to high relative humidity (70–80%) for a period of time (2 days or over), during which period considerable moisture is absorbed, and the tape is then dried out, either by a lowering of relative humidity or an increase in temperature, a very substantial drop in quick tack value results. (Quick tack or adhesive value is measured by TAPPI Method 463M as referred to in Federal Specification UU–T–111b.) Thus starting with a good quick tack value of 80 for 3" wide tape the value may drop to as low as 20 under the particular conditions of exposure noted. Despite this serious loss of quick tack it is notable that none of the other adhesive characteristics appear to be affected. The gum retains its water solubility and its ability to produce a good paper tearing bond. Also of note is the fact that while the tape is at high humidity there is no loss but rather a gain in quick tack. Only after drying out does the loss in quick tack become evident.

As indicated previously the conditions which develop loss of quick tack are unusual and may only rarely be encountered in practical application. The possibility is, however, recognized as a potential product weakness and therefore, extensive investigation has been directed toward its correction.

Based on our knowledge that dried films of sulphite liquor concentrate possess no quick tack properties, films of polyvinyl alcohol only moderate quick properties, and mixtures of sulphite concentrate and P.V.A. excellent quick tack, it is our opinion that migration of the sulphite liquor under the unusual conditions noted is responsible for the loss of quick tack. Our theory is that when films of adhesive composed of a mixture of sulphite liquor concentrate and P.V.A. are subjected to conditions of high relative humidity, the composition becomes sufficiently mobile to permit physical movement of one ingredient with respect to the other. Thus, because the net result is a loss in quick tack approaching the value of unaltered sulphite liquor it is our opinion that the sulphite liquor moves to the exposed surface forming a microscopic outer layer in which little or no P.V.A. exists.

Although migration appears as a likely explanation for the unusual behavior described in the foregoing our purpose is not the development of theory but rather the development of practical corrective means. These means, which will be described in the following we consider novel and the results indeed surprising.

We have found that the addition of substantial quantities of non-aqueous, water immiscible substances to our adhesive prevents the unusual behavior described in the foregoing, making it possible to produce remoistenable gummed tape, stable or enduring as regards quick tack, irrespective of any reasonable conditions of exposure. We have found further that these substances, while serving as effective corrective additions for quick tack stability, have little or no adverse effect on the other well established good qualities of the adhesive.

As an example of the additions we have found very effective, dibutyl phthalate included in our sulphite liquor-P.V.A. compositions, when prepared for gummed tape application, and used in a percentage of ten percent or more, will stabilize the quick tack value of the tape and completely eliminate the undesirable behavior under the unusual, but possible conditions of exposure previously noted.

As a specific example, 91 parts of desugarized dry sulphite concentrate and 9 parts of polyvinyl alcohols are mixed with 100 parts of water as disclosed in U.S. Patent No. 2,443,889. To this completely dissolved mixture, maintained at a temperature of above 140° F. at about 180° F., is added 20 parts of dibutyl phthalate, and mixing is continued to thorough blending, the dibutyl phthalate remaining in suspension. The adhesive thus prepared is ready for use in the manufacture of gummed tape by conventional established means.

As regards the amount of dibutyl phthalate required for stabilization, we have found that up to the requirement for complete correction a beneficial antimigratory effect is gained in about direct proportion to the amount of additive used. Thus using 100 dry parts of our sulphite concentrate-P.V.A. adhesive as a base, additions of from about five to about thirty parts of dibutyl phthalate have increasingly beneficial effect with 20 parts and over, effecting complete correction.

It is interesting to note that in the example given no water soluble plasticizer has been included. We have found that despite the non-water soluble nature of the additive it appears to function as an antimigratory agent, contributing measurably to retention of a degree of softness in the dried adhesive film as well as promoting ready acceptance of water on remoistening. This discovery is indeed important because it eliminates the necescity for water soluble plasticizers such as glycerine or glycol, all of which are hygroscopic and this along with the use of desugarized sulphite liquor concentrate eliminates a problem of blocking formerly corrected by other means as disclosed in our U.S. Patent No. 2,443,889.

Although dibutyl phthalate is disclosed in our original example and may therefore be considered preferred, we have discovered that other materials, widely differing in organic structure may be used alone or in combination as equally effective stabilizers which also cause the moisture sensitive coating of tape to retain its quick tack properties. We refer to this permanent condition as enduring. Included in this list are oily liquid chemical compounds such as tricresyl phosphate, diamyl phthalate and diethyl malate and several low melting chemicals, such as orthonitrodiphenyl and chlorinated diphenyl. Also as indicated previously we have found mixtures of these different suspension reagents effective.

In view of the different chemical nature of the chemicals found satisfactory, it is our belief that our invention, simply stated, is the addition of substantial amounts of such chemicals to our sulphite liquor concentrate-P.V.A. adhesive resulting in the retention of the superior quick tack stability under any reasonable conditions of exposure as well as the antimigratory effect on the adhesive coating.

As stated previously dibutyl phthalate additions, as low as roughly 5% (based on the dry adhesive) contribute some improvement, but 10% or more is preferable. About 20% of this suspension additive gives complete correction against migration of the sulphite liquor to the surface of the coating, and additions as high as roughly 30% may be accommodated. Since we have established that the other substances listed are effective in about the same proportion as those given for dibutyl phthalate, it may be concluded that non-aqueous, water immiscible oily materials, either liquid at room temperature or of low melt point (not over 140° F.) added to our sulphite liquor-P.V.A. adhesive in amounts ranging between the limits 5 and 30% (based on dry weight of adhesive) result in superior enduring and unexpected quick tack stability retained through the use of a migration inhibiting suspension reagent of the character specified.

Having thus described our invention, what we claim as new and desire to secure by Letters Patent is:

1. An adhesive mixture suitable for application to tape to form a dry non-blocking water remoistenable surface having an enduring quick tack and which consists in the product of the admixture, at a temperature above 140° F. of an adhesive the active adhesive agent therein consisting of at least three percent of polyvinyl alcohol with at least seventy-five percent of desugarized concentrate of waste sulphite liquor containing lignosulphonic acid calculated on a dry basis, with at least five percent by weight on a dry basis of a migration inhibitor, which prevents migration of the sulphite liquor to the water remoistenable surface, comprising a suspension additive of the class consisting of dibutyl phthalate, tricresyl phosphate, diamyl phthalate, diethyl malate, orthonitrodiphenyl, and chlorinated diphenyl.

2. An adhesive mixture suitable for application to tape to form a dry non-blocking water remoistenable surface having an enduring quick tack and which consists in the product of the admixture, at a temperature above 140° F. of an adhesive composed of polyvinyl alcohol and lignosulphonic acid with a suspension additive of at least five percent on a dry basis of a migration inhibitor which prevents migration of the sulphite liquor to the water remoistenable surface, of the class which consists of dibutyl phthalate, tricresyl phosphate, diamyl phthalate, diethyl malate, orthonitro-diphenyl and chlorinated diphenyl.

References Cited in the file of this patent

UNITED STATES PATENTS

| | | |
|---|---|---|
| 2,242,601 | Wallace | May 20, 1941 |
| 2,443,889 | Bruce et al. | June 22, 1948 |
| 2,579,481 | Fenn | Dec. 25, 1951 |